S. R. Thompson,
Plow.

No. 89,608. Patented May 4, 1869.

Witnesses

Samuel R. Thompson
by his attorney

United States Patent Office.

SAMUEL R. THOMPSON, OF NEW MARKET, NEW HAMPSHIRE, ASSIGNOR TO HIMSELF AND JOSEPH PINKHAM, OF SAME PLACE.

Letters Patent No. 89,608, dated May 4, 1869.

IMPROVEMENT IN PLOWS.

The Schedule referred to in these Letters Patent and making part of the same.

*To all persons to whom these presents may come:*

Be it known that I, SAMUEL R. THOMPSON, of New Market, in the county of Rockingham and State of New Hampshire, have invented a new and useful Improvement in Plows; and do hereby declare the same to be fully described in the following specification and represented in the accompanying drawings, of which—

Figure 1:
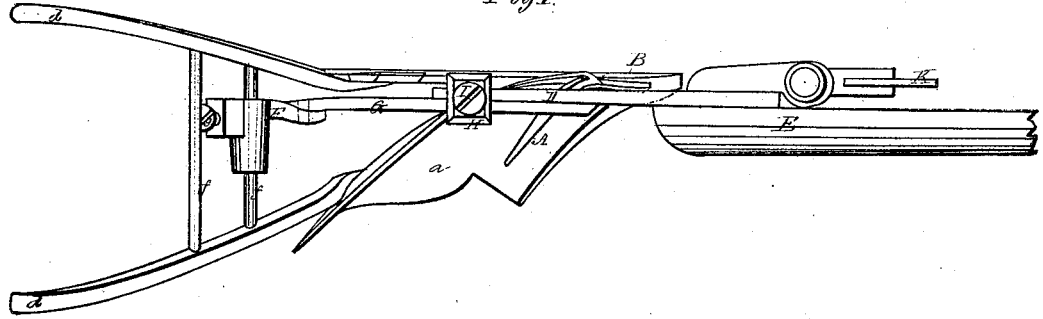
Figure 2:
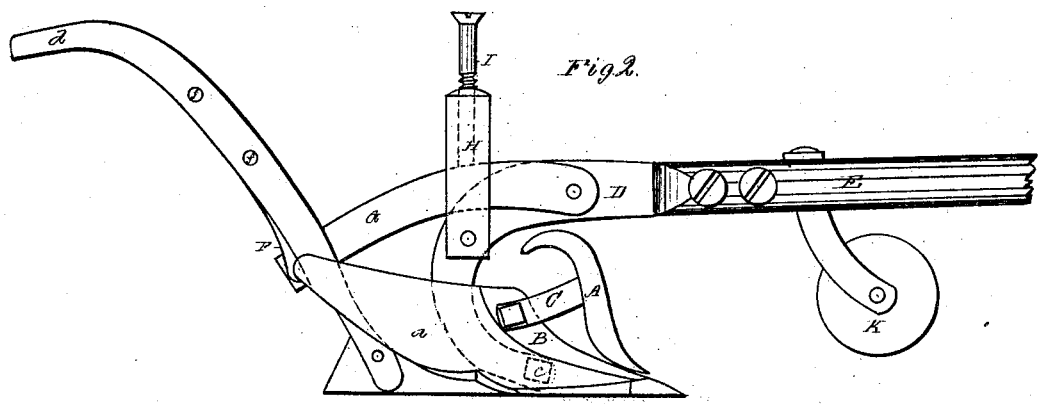

Figure 1 is a top view;

Figure 2, a side elevation; and

Figure 3:
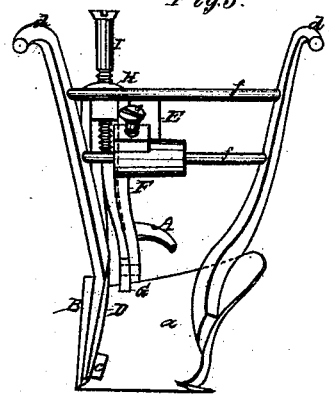

Figure 3, a rear view of a plow provided with my invention.

In the said plow the coulter is shown at A, as fastened to the share B by an arm, C, extending therefrom, and such coulter, instead of being fastened at its upper part to the plow-beam D in the ordinary way, is bent or turned over the mould-board a, in manner as represented, the same being for the purpose of preventing grass, roots, or other matters which may pull up the coulter from being clogged between it and the beam as they often do, for with the coulter made and supported by the share in manner as described, the grass and roots, in mounting upward on the coulter while the plow may be in use, will pass between the coulter and the beam and over the coulter, and be discharged therefrom, so as to drop upon the ground in a manner to be covered by the earth thrown up by the mould-board.

Furthermore, a tongue, E, is fastened to and projected from the beam, and the said beam is curved down as shown at a', and at or near its lower end is hinged or pivoted to the plowshare, the pivot or bolt being represented at c.

This enables the plow-beam and the tongue thereof to be forced up and down independently of the plowshare, or, in other words, it enables a plowman while hold of the handles, d d, of the plow, to pitch the plow more or less without being controlled by the beam.

Furthermore, it brings the joint of traction down just in rear of the nose of the plow, and thus enables the plow to be operated to much better advantage than when it has the beam applied to the share and the handles in the ordinary way.

A lever, F, arranged on one of the cross-rods, f f, connecting the plow-handles and provided with a screw, g, by which it may be clamped to such rod, is to be capable of turning thereon but of being slid on the rod from either handle toward the other. At its lower end the said lever is jointed to one end of a bar, G, which, at its other end, is also jointed to the plow-beam.

A forked spanner, H, embracing the beam and the bar, G, and pivoted to the beam, has a clamp-screw, I, which screw screws vertically through the upper part of the spanner and against the upper edge of the bar G.

The said screw, the spanner, and the bar G serve as a means of arresting the upward motion of the beam, or of adjusting the pitch of the share relatively to the beam.

The lever F, with its screw, affords a means by which the beam may be moved more or less laterally and set either parallel with, or more or less inclined to the land-side of the share, as circumstances may require.

The caster, or wheel for supporting the end of the beam, is shown at K.

I claim in the said plow the following as of my invention:

The combination of the tongue with the plow-beam.

Also, the coulter A, as separate from the beam and supported by an arm, C, or its equivalent, projecting from the plowshare.

Also, the combination of the bar G, the forked spanner H, the lever F, and their screws with the plow-beam pivoted to the share so as to operate therewith substantially as described, the lever F being applied to the handles of the plow as set forth.

SAMUEL R. THOMPSON.

Witnesses:
R. H. EDDY,
F. P. HALE, Jr.